(12) United States Patent
Rodrigues (10) Patent No.: US 9,909,623 B2
(45) Date of Patent: Mar. 6, 2018

(54) BEARING LUBRICATION SYSTEM

(71) Applicant: Carl-Eiler Rodrigues, Rotherham (GB)

(72) Inventor: Carl-Eiler Rodrigues, Rotherham (GB)

(73) Assignee: AES Engineering Ltd., Rotherham (GB)

( * ) Notice: Subject to any disclaimer, the term of this patent is extended or adjusted under 35 U.S.C. 154(b) by 168 days.

(21) Appl. No.: 14/817,055

(22) Filed: Aug. 3, 2015

(65) Prior Publication Data

US 2016/0032977 A1    Feb. 4, 2016

(30) Foreign Application Priority Data

Aug. 4, 2014   (GB) .................................. 1413799.6

(51) Int. Cl.
*F16C 33/66*    (2006.01)

(52) U.S. Cl.
CPC ........ *F16C 33/6662* (2013.01); *F16C 33/667* (2013.01); *F16C 33/6659* (2013.01)

(58) Field of Classification Search
CPC .. F16C 33/6659; F16C 33/667; F16C 33/662; F16C 33/6674
USPC ..................... 184/6.24, 6.26, 6.12
See application file for complete search history.

(56) References Cited

U.S. PATENT DOCUMENTS

| | | | | |
|---|---|---|---|---|
| 3,612,631 A * | 10/1971 | O'Connor | ........... | F16C 33/6662 384/468 |
| 4,050,237 A * | 9/1977 | Pall | ................... | B01D 39/1676 55/385.4 |
| 4,201,276 A * | 5/1980 | Bardin | ...................... | F16N 7/34 184/55.2 |
| 5,011,388 A * | 4/1991 | Aoki | ..................... | F04C 29/026 184/6.24 |
| 5,186,278 A * | 2/1993 | Ives | ........................ | F01M 13/04 123/572 |
| 5,318,152 A * | 6/1994 | Ehlert | ....................... | F16N 7/32 184/104.1 |
| 5,623,870 A * | 4/1997 | Daniel | ................ | B30B 15/0052 100/102 |
| 5,715,912 A * | 2/1998 | Maxwell | ................... | F16N 7/32 184/6.12 |
| 5,718,744 A * | 2/1998 | Ehlert | ................ | B01D 46/0031 184/6.23 |
| 6,065,689 A * | 5/2000 | Kizer | ....................... | F16N 7/34 184/55.1 |
| 6,234,459 B1 * | 5/2001 | Rock | ...................... | A61M 11/06 128/203.12 |
| 6,290,024 B1 * | 9/2001 | Ehlert | ...................... | F16N 7/32 184/6.22 |
| 6,311,984 B1 * | 11/2001 | Orlowski | ............... | F16J 15/004 277/412 |
| 8,789,656 B2 * | 7/2014 | Eccles | ................ | F16C 33/6662 184/6.12 |

(Continued)

*Primary Examiner* — William E Dondero
*Assistant Examiner* — Mark K Buse
(74) *Attorney, Agent, or Firm* — Edwin D. Schindler (57) ABSTRACT

A bearing lubrication apparatus for use with a piece of rotating equipment includes a lubrication device having a bearing chamber with bearings located in the bearing chamber, a mist generating unit positioned below the bearing chamber and being in fluid communication with the bearing chamber, at least one mist inlet directed into the bearing chamber and being in fluid communication with the mist generating unit, and a coalescing unit adjacent the bearing chamber.

13 Claims, 7 Drawing Sheets

(56) References Cited

U.S. PATENT DOCUMENTS

| | | | | |
|---|---|---|---|---|
| 9,010,494 B2* | 4/2015 | Roddis | ............... | F16C 33/6662 |
| | | | | 184/55.1 |
| 9,293,961 B2* | 3/2016 | Momin | .................... | H02K 5/10 |
| 2010/0193295 A1* | 8/2010 | Roddis | ............... | F16C 33/6662 |
| | | | | 184/6.26 |
| 2014/0105528 A1* | 4/2014 | Hayashi | ................. | F16C 33/46 |
| | | | | 384/468 |
| 2015/0226266 A1* | 8/2015 | Mori | ...................... | F16C 33/76 |
| | | | | 384/467 |

* cited by examiner

BEARING LUBRICATION SYSTEM

BACKGROUND OF THE INVENTION

Technical Field of the Invention

The present invention relates, generally, to the lubrication of bearings and internal components through the use of oil mist.

Description of the Prior Art

It is widely agreed within the rotating equipment market that oil mist lubrication of bearings offers many advantages over standard oil sump lubrication. The oil intended for lubrication is atomized prior to being introduced into the bearing chamber and contacts the surface of the bearings to create an oil film. Due to the bearings not running through the oil sump, such improvements can be seen in the areas of power consumption, oil consumption, the amount of heat generated and the amount of wear on the rotating and stationary components.

Oil mist as a form of lubrication has been in existence for many years. It typically exists in the form of large scale centralized systems that distribute mist to a large number of bearing chambers. Although the use of oil mist has shown to significantly improve the general running of bearing chambers it does have a number of restrictions which have meant that it is still not widely used:

Due to the centralized nature of the oil misting unit, all of the attached equipment must be within a 500-meter radius;

Any damage that occurs to the unit has the potential to affect all the attached machinery and thus can be extremely costly in the event of a failure;

High initial and installation costs deem it unfeasible on smaller or older plants;

The physical space required is large, with a central system and hard-piping to transfer the oil mist;

It is a compromised solution, unable to meet the oil mist requirements for pumps as only one specific oil can be selected, other pumps needing different oils would have to use conventional lubrication methods;

In the event that equipment is moved or relocated, little flexibility is offered;

Distribution pipe work, from a centralized system must be inclined from the source, so to allow coalesced oil mist to run back to the source under gravity.

The prior art includes lubrication systems, e.g., P.C.T. Application Publication No. WO 2007/028935, that have shown that by using a singular unit per housing many advantages can be achieved. The item has lower initial and installation costs, specific oil can be used with individual pieces of equipment and there is low level of maintenance.

One problem with this type of single-point lubrication system, however, is that it generates a large amount of positive pressure within the housing, due to the method of drawing oil from the chamber up to the misting unit above. This is not only an inefficient use of compressed/dried air, but also requires that the bearing housing has costly positive bearing seals installed to contain the oil mist.

Another problem is that oil mist will escape to atmosphere if the venting system only uses the positive pressure created by the mister to force it through a filter.

In addition, this kind of system can suffer from the following effects:

Trapped air within the oil suction tube can occur if a drop in pressure occurs, causing inconsistent misting results;

Blockages or restrictions in the vertical line can cause the supply of oil to be cut off completely, resulting in no mist generation;

Mist is input into the central bearing chamber contacting only some of the bearing race.

SUMMARY OF THE INVENTION

The invention is directed to a bearing lubrication device for use with a piece of rotating equipment, the lubrication device comprising a bearing chamber with bearings located therein, the bearing lubrication device including:

a mist generating unit positioned below the bearing chamber and being in fluid communication with the atrium;

at least one mist inlet directed into the bearing chamber and being in fluid communication with the mist generation unit; and, a coalescing unit adjacent the bearing chamber.

Thus, according to the present invention, the bearing chamber device includes a mist generating unit and coalescing unit. The mist unit connects to the equipment in so that an internal venturi system is fed oil via a micro reservoir through gravity supplied by the sump. It is then atomized by a nozzle to create mist and piped directly to the point of contact. It is then positively drawn through the chamber via a vacuum pump system with the excess air produced in the atomization process. This air/mist mix is pushed through a coalescing filter, exhausting clean air and returning liquid back into the chamber.

Preferably, the bearing lubrication apparatus comprises a closed loop system, which re-circulates the mist and returns the oil used back into the sump, meaning only a minimum amount of oil is lost.

Preferably, the mist generating unit has no moving parts and is powered only by an air supply to increase reliability.

Preferably, the mist generating unit atomises the liquid oil into mist by combining the liquid with gas.

Preferably, the gas used is under a positive pressure from a standard supply source in order to break up the liquid into smaller particles.

More preferably, the gas flow is restricted to a set level using an orifice restrictor which can be used with a variety of supply pressures.

Preferably, the mist generating unit uses a nozzle to direct the gas at the liquid.

More preferably, the gas is forced into a conical vortex prior to going through the nozzle so as to induce an increased negative pressure within the venturi.

More preferably, the vortex can be created using standard tooling with a depth of 0.0254 cm (0.010") and width of 2 mm at an orientation of 90 degrees tangentially to the conical vortex.

More preferably, the nozzle should have a small diameter to produce a fine mist with predominantly small particles. This also increases efficiency through using less gas when creating mist.

Preferably, the nozzle ejects gas perpendicularly through the lubrication aperture with a diameter of between 0.2 mm and 0.5 mm.

Preferably, the gas moving from the small nozzle opens out into a large space to create a low pressure system to help feed the oil into the path of the gas.

Preferably, to increase the effectiveness of the low pressure system and decrease the particle size, a micro reservoir is incorporated into the design between the nozzle and open space.

More preferably, the micro reservoir is fed directly though gravity as this means the venturi effect generated does not need to be as strong and the supply is constant.

Preferably, the mist generating unit is constructed from segments to increase usability and machining ease. This allows for a modular system to be employed.

More preferably, the segments can be rotated in many arrangements at orientations of 90°, thereby allowing the user to modify the situation of features in accordance with their plant layout.

More preferably, the features might be ports, plugs, piping or valves.

Preferably, these segments interface with one another using sealing members.

More preferably, these sealing members and elastomeric and in the form of O-rings or gaskets.

Preferably, the claimed bearing lubrication device is fastened together axially using bolts.

Preferably, the coalescing unit filters the lubricant mist, combining the smaller mist particles to form liquid oil. It equalizes the pressure created by the mist generating unit, creating a fully closed loop system.

More preferably, the coalescing unit is cylindrical and functions with the air flow moving from the outer diameter to the inner diameter.

Preferably, there is a pressure equalization within the chamber which is controlled by a number of factors including:

An orifice restrictor which can be fixed or variable;

The vent to atmosphere;

The non return valve; and,

The chamber air flow regulator.

Preferably, the non-return valve is an umbrella valve to offer the least amount of resistance.

Preferably, the chamber air flow regulator has an area of 0.5 mm circumferentially to allow a set level of air to enter the chamber while also allowing oil to enter and not block it.

Preferably, non-contacting bearing isolators can be used instead of positive sealing bearings due to the unique way of creating a closed loop system controlling the air flow and creating atmospheric pressure within the chamber.

The "gravity-fed" arrangement within the mist unit, according the present invention, aids the vortex venturi in drawing oil from the sump into the oil/air mixing point where mist is created. Without this aiding feature, additional air flow is needed to create suction to draw the oil up a tube, which is not only an inefficient use of air but more significantly adds unwanted excess pressure into the bearing housing. Excessive positive pressure within the bearing housing will result in mist escaping to atmosphere. Within a closed loop system, mist escaping to atmosphere is undesirable as oil is lost and requires refilling more frequently.

The "vacuum pump" arrangement within the coalescing unit draws the mist and air produced by the mist unit back out of the chamber and through a coalescing filter. This system can be finely adjusted to create either a vacuum, atmospheric or positive pressure within the chamber. The coalesced mist then drips back into the chamber as oil, returning the oil to the sump and completing the cycle of the closed loop system.

Further aspects of the present invention that were found to be beneficial during development but not essential for operation include:

The "umbrella valve" creates a positive seal on the vent of the coalescing unit when not in operation, stopping the ingress of potential atmospheric moisture entering the chamber through thermodynamic flow during cooling.

The "inverted filter" allows a larger area for mist to enter the coalescing filter by using the outer diameter of the cylinder rather than inner diameter.

The "chamber air flow regulator" allows a specific amount of venting air to enter the chamber to regulate internal bearing housing pressure.

The "oil diversion plate" redirects oil dripping back into the chamber sump, thus stopping it from re-entering the suction tube to be coalesced again.

The invention extends to a method of misting bearings wherein the mist is sprayed towards the bearings and a negative pressure ensures that any excess mist is retained within the chamber housing and recycled through the mist generating device.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views:

FIG. 1 shows a schematic of an example set up using a pump housing and airline;

FIG. 2 shows a front view of an example set up with a pump bearing housing, highlighting the coalescing unit and piping;

FIG. 3 shows a rear view of an example set up with a pump bearing housing, highlighting the mist generating unit and oil level sight;

FIG. 4 shows a cross-sectional view through the air inlet port showing; the vacuum, suction, air chamber, oil inlet and filter being within the apparatus;

FIG. 5 shows a cross-sectional view (with break lines) through the air vent ports showing; the umbrella valve and vent gap within the apparatus;

FIG. 6 shows a cross-sectional view through the oil channels showing; the primary oil inlet port, oil reservoir and tightening flats; and, FIG. 7 shows a cross-sectional view through the air inlet port showing; the magnetic drain plug, fastening bolts, mist generation chamber, mist outlet and vortex.

DETAILED DESCRIPTION OF THE DRAWING FIGURES AND PREFERRED EMBODIMENTS

FIGS. 1-7 include the following structural components: air inlet 1, bearing housing 2, shaft 3, bearings 4, air input 5, coalescing unit 6, mist unit 7, piping 8, oil sump 9, bearing chamber 10, atrium 10A, mist inlet port 11, vortex input line 12, mist outlet line 13, pipe tee fitting 14, orifice restrictor 15, oil level sight port 16, venturi inlet port 17, vacuum tube 18, vacuum inlet 19, vacuum outlet 20, mist chamber 21, coalescing filter 22, restrictor channel 23, diversion plate 24, thread 25, funnel 26, flats 27, exhaust vents 28, umbrella valve 29, top cap 30, vent gap 31, oil feed channels 32, oil chamber inlet 33, micro reservoir 34, vortex input port 35, mist outlet port 36, atomization point 37, bolts 38, magnetic drain plug 39, glass cylinder 40.

Figure 1:
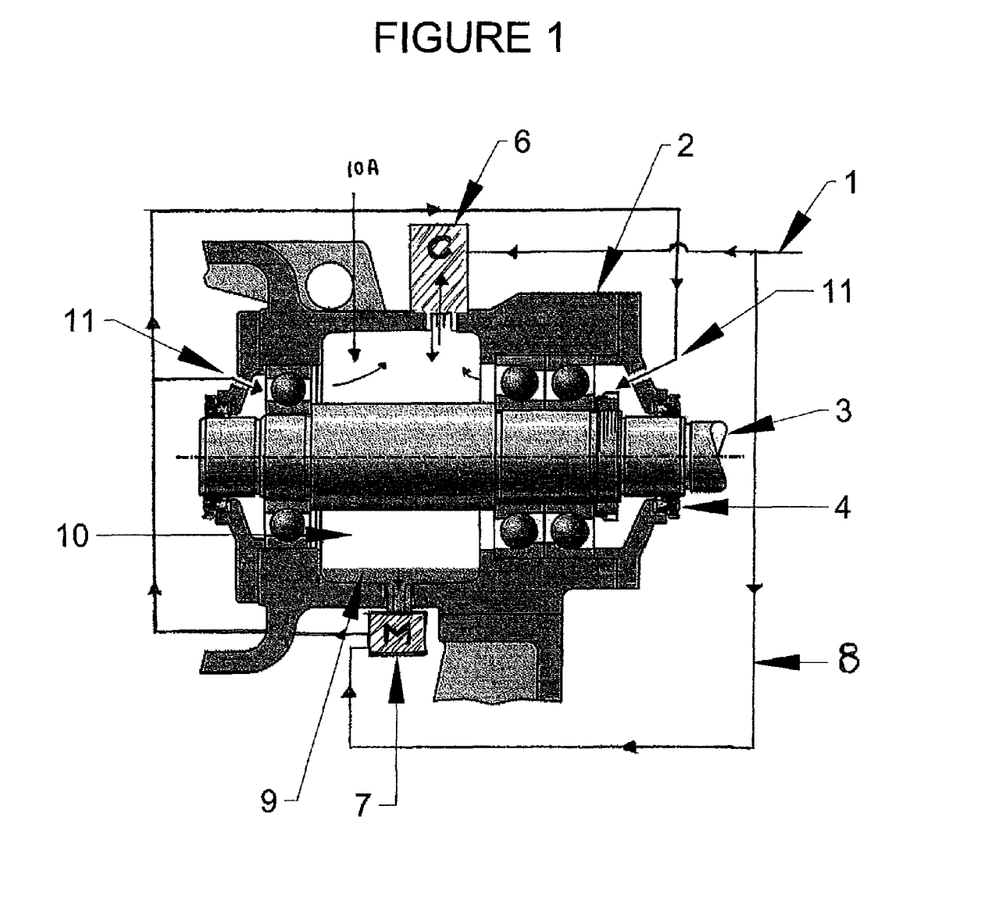

Turning now, in detail, to an analysis of the drawing figures, FIG. 1 is a schematic showing a preferred embodiment of bearing housing 2, which would commonly be used as part of a centrifugal pump (not shown) or other piece of rotating equipment. The shaft 3 is mounted on the bearings 4. The bearings 4 are commonly lubricated by rolling through the oil sump 9; this would be a normal operating condition. The condition shown is a pure mist condition, whereby the oil sump 9 supplies only the mist unit 7 and does not directly lubricate the bearings 4. The oil feeds the mist unit 7 using gravity and combines the oil with air to create mist which is input directly to the bearings 4 through the mist inlet ports 11. The coalescing unit 6 then counteracts the positive pressure produced by the mist unit 7 by creating a vacuum and drawing mist into it. This mist is then filtered by the coalescing unit 6 and returned to the oil sump 9 as liquid oil. The mist and filter condition can be viewed through the glass cylinder 40.

Figure 2:
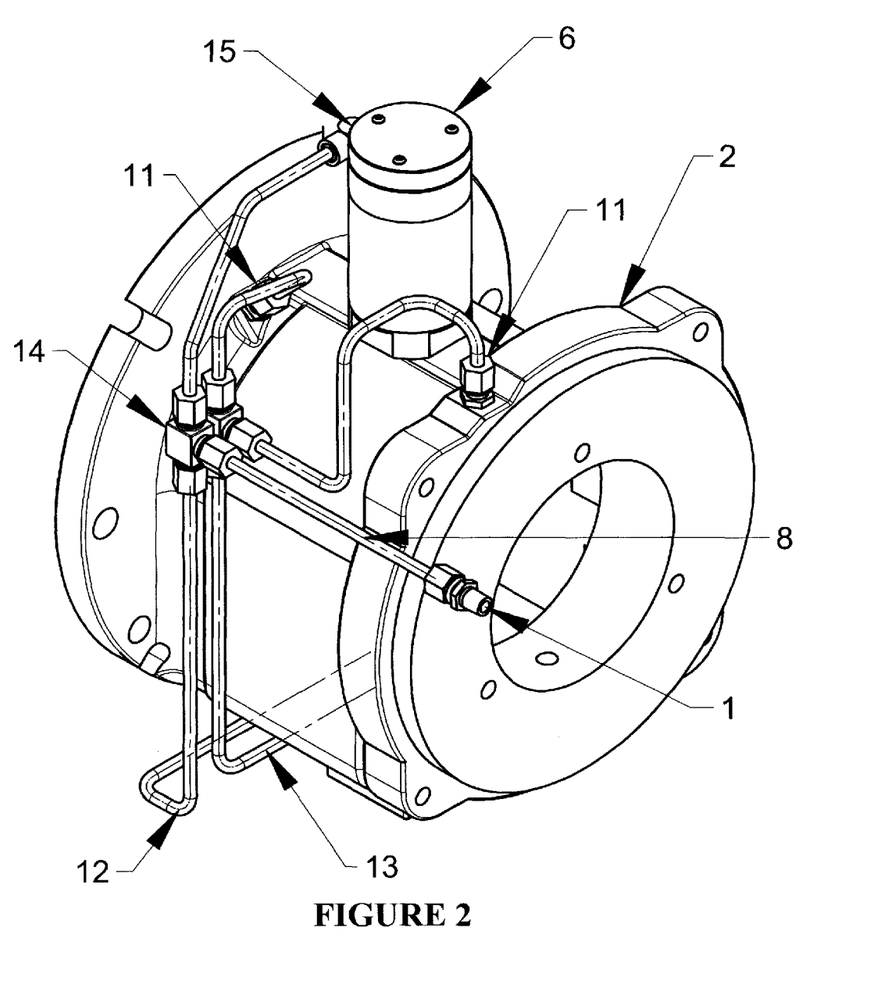

FIG. 2 presents a three-dimensional representation of the preferred embodiment of bearing housing 2 without the shaft 3 or bearings 4. The air inlet 1 is split using a pipe tee fitting 14 and supplies air through the vortex input line 12 into the mist unit 7 (shown in FIG. 3.) The air inlet 1 also supplies the coalescing unit 6 with power to operate the internal features. The amount of air supplied is controlled by the orifice restrictor 14.

Figure 3:
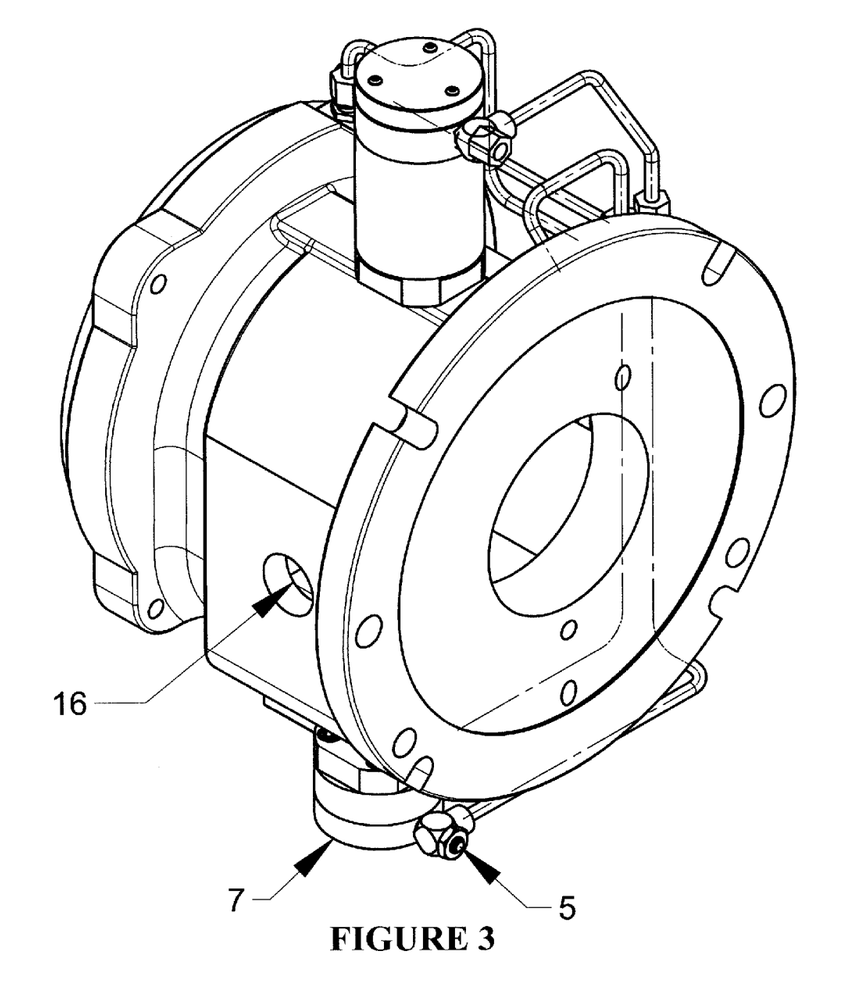

FIG. 3 shows the reverse view of FIG. 2, highlighting the oil level sight port 16, mist unit 7, which is supplied by the vortex input line 12, and has an orifice restrictor 14 to control the amount of mist and internal pressurization.

Figure 4:
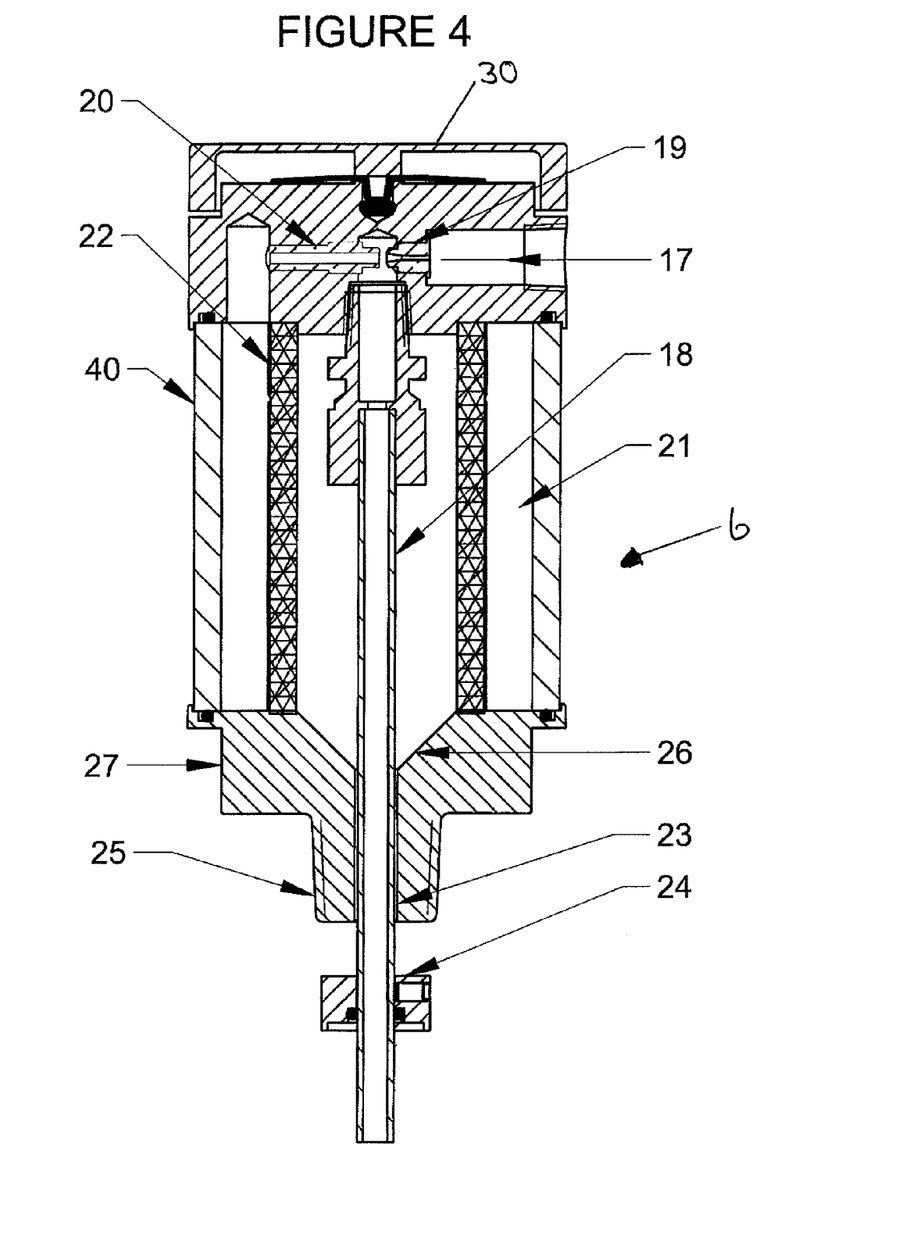

FIG. 4 shows a cross-sectional view of the coalescing unit 6 through the venturi inlet port 17 to show the internal flow of air and mist. The unit is fixed to the top of the bearing housing 2 via a spanner using the flats 27 and a sealing thread 25 which inserts into the fill port. The suction used to draw mist into the coalescing unit 6 through the vacuum tube 18, is generated using the small orifice within the vacuum inlet 19 and the larger orifice in the vacuum outlet 20. The air/mist which is drawn into the coalescing unit 6 enters the mist chamber 21, and is forced through the coalescing filter 22 outer diameter. The mist is then coalesced with the excess air vented to atmosphere (not shown) and restricted from over-pressurizing the bearing housing 2 by using a restrictor channel 23. The chamfered funnel 26 and restrictor channel 23 allow oil to re-enter the chamber and is diverted away from the suction end of the vacuum tube 18 using a diversion plate 24. The entire unit is held together under compression via the bolts 38.

Figure 5:
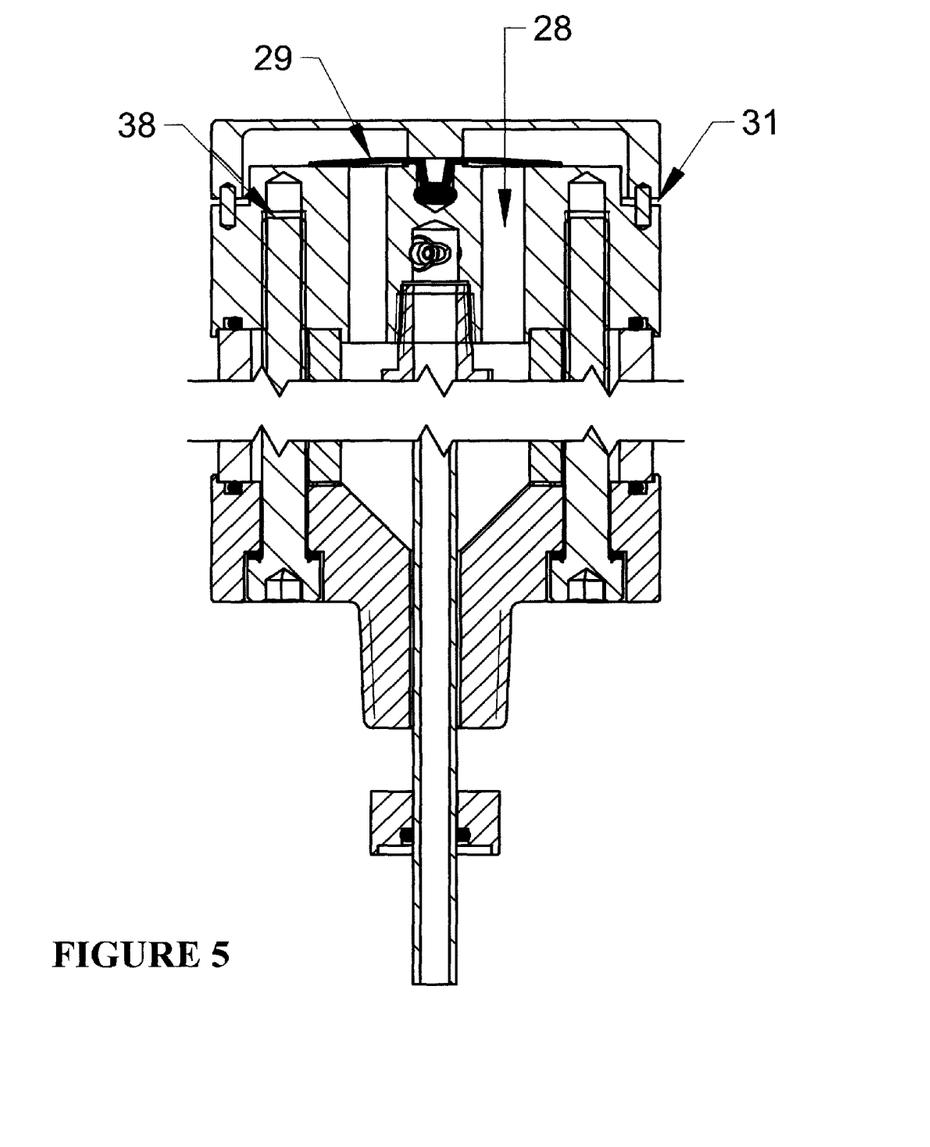

FIG. 5 shows a cross-sectional view of the coalescing unit 6 though the vent ports to show the internal flow of mist venting. When clean mist free air enters the internal diameter of the coalescing filter 22, it flows through the exhaust vents 28 forcing the umbrella valve 29 to open. When non-operational the umbrella valve 29 positively seals to stop the ingress of moisture laden air into the bearing housing 2.

The top cap 30 protects the internal components and holds the umbrella valve 29 in place. In addition is sets a specified vent gap 31 dimension.

Figure 6:
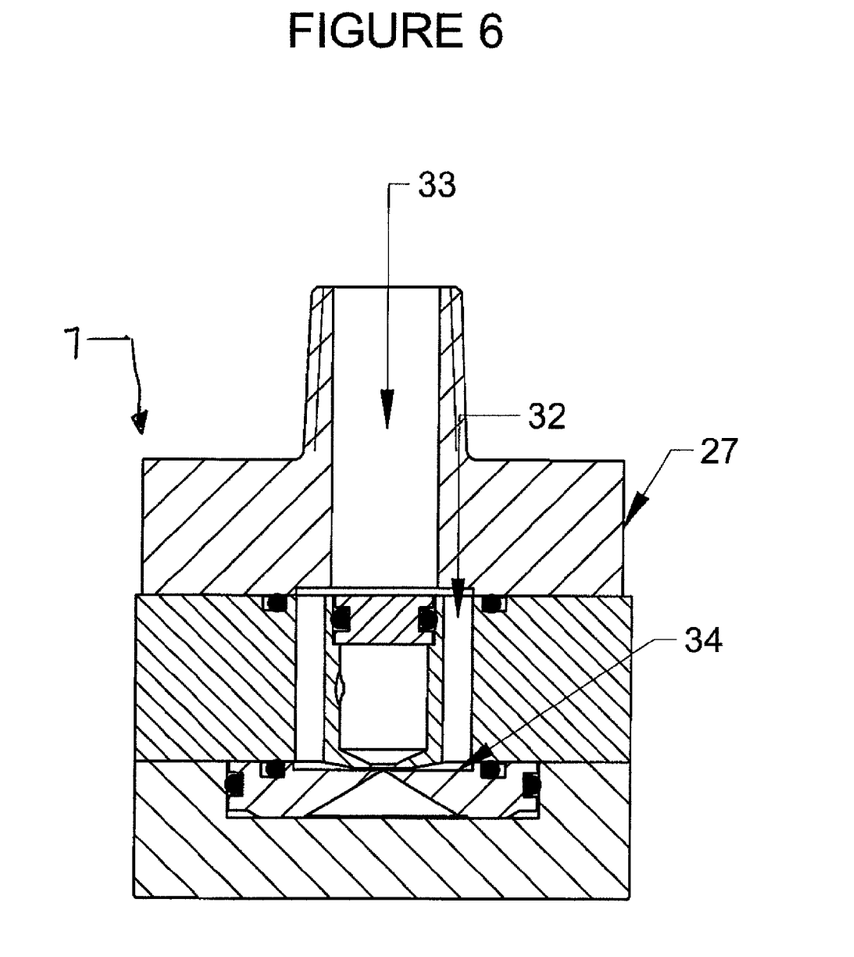

FIG. 6 shows a cross-sectional view of the mist unit 7 through the oil feed channels 32 to show the internal flow of oil and air. The unit is fixed in a similar method to the coalescing unit 6, however uses the bearing housing 2 drain port. The oil within the oil sump 9 flows into the oil chamber 33 and through the oil feed channels 32 onto the micro reservoir 34 where the oil meets air.

Figure 7:
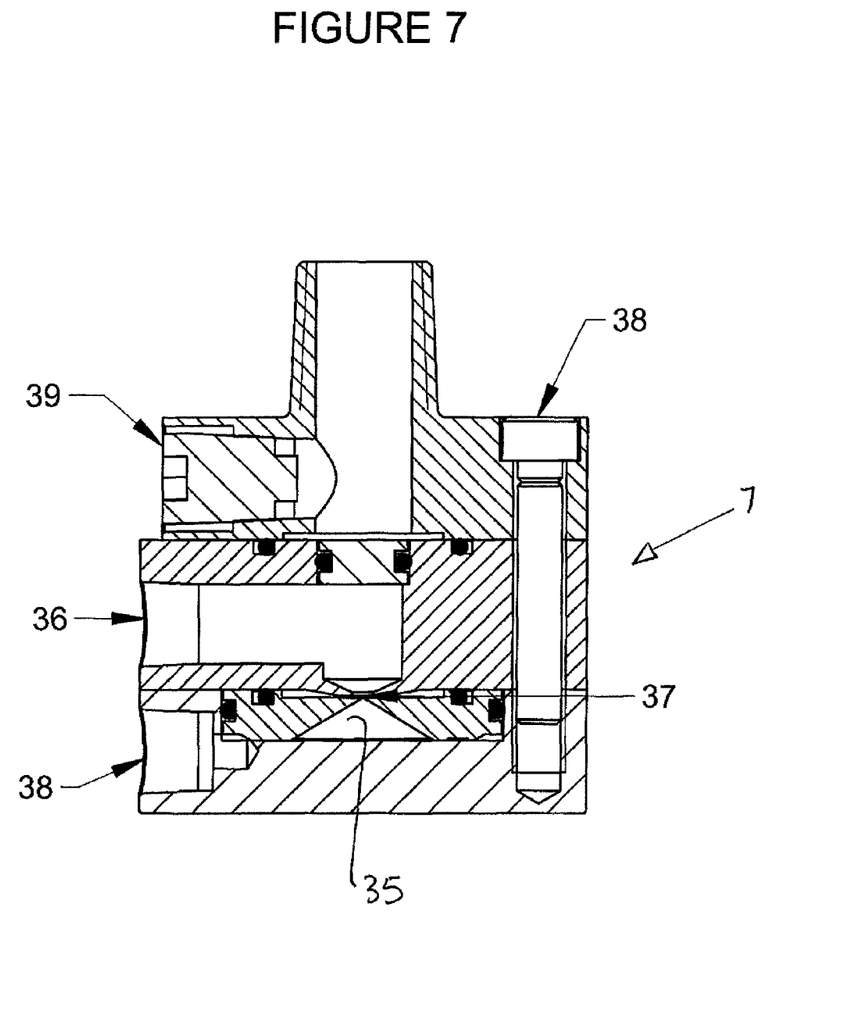

FIG. 7 shows a cross-sectional area of the vortex input port 35 and mist outlet port 36. When operational, the vortex input port 35 directs the air into the vortex which passes through the oil in the micro reservoir 34, which maintains a constant level through gravity. At the atomization point 37, the oil and air mix to create mist which is then transported via the mist outlet port 36. Before the oil enters the reservoir, it passes the magnetic drain plug 39, which attracts unwanted fragments of metal within the oil, which can be taken out and cleaned. The entire unit is held together under compression via the bolts 38.

While only several embodiments of the present invention have been shown and described, it will be obvious to those skilled in the art that many modifications may be made to the present invention without departing from the spirit and scope thereof.

What is claimed is:

1. A bearing lubrication apparatus for use with a piece of rotating equipment, comprising:
    a lubrication device comprising a bearing chamber with bearings located within said bearing chamber;
    a mist generating device positioned below said bearing chamber when a shaft of a piece of rotating equipment is arranged horizontally, while said mist generating device is positioned below a level of oil located within an atrium of said bearing chamber, said mist generating device being in fluid communication with the atrium of said bearing chamber and located below the level of oil in the atrium for permitting a flow of oil from the atrium of said bearing chamber to said mist generating device via a gravity feed;
    a mist inlet directed into said bearing chamber and being in fluid communication with said mist generating unit; and,
    a coalescing unit adjacent said bearing chamber.

2. The bearing lubrication apparatus for use with a piece of rotating equipment according to claim 1, wherein said bearings are provided in a peripheral area of said bearing chamber with said mist inlet being external to said bearings and directed toward said bearings in a direction of said bearing chamber.

3. The bearing lubrication apparatus for use with a piece of rotating equipment according to claim 1, wherein said lubrication device is a substantially closed loop system.

4. The bearing lubrication apparatus for use with a piece of rotating equipment according to claim 1, wherein said mist generating unit includes a reservoir for receiving oil from the atrium, and further includes a positive pressure gas inlet.

5. The bearing lubrication apparatus for use with a piece of rotating equipment according to claim 4, wherein said mist generating unit includes a nozzle through which mist is generated.

6. The bearing lubrication apparatus for use with a piece of rotating equipment according to claim 5, further comprising a conical vortex adjacent said nozzle.

7. The bearing lubrication apparatus for use with a piece of rotating equipment according to claim 5, further comprising a mist chamber adjacent said nozzle for creating a sub-atmospheric pressure apparatus.

8. The bearing lubrication apparatus for use with a piece of rotating equipment according to claim 1, wherein said mist inlet is positioned above the rotating equipment and is connected to said mist generating unit via a conduit.

9. The bearing lubrication apparatus for use with a piece of rotating equipment according to claim 1, wherein said coalescing unit filters mist within the atrium and is capable of changing pressure within said apparatus.

10. The bearing lubrication apparatus for use with a piece of rotating equipment according to claim 9, wherein said coalescing unit includes an orifice restrictor.

11. The bearing lubrication apparatus for use with a piece of rotating equipment according to claim 9, wherein said coalescing unit includes means for equalizing pressure having a vent which comprises a non-return valve for reducing risk of ingress of air.

12. The bearing lubrication apparatus for use with a piece of rotating equipment according to claim 11, wherein said non-return valve comprises an umbrella valve.

13. The bearing lubrication apparatus for use with a piece of rotating equipment according to claim 1, further comprising a magnet located within said mist generating unit is connected to said bearing chamber via a conduit and said magnet is adjacent said conduit and in fluid communication therewith.

* * * * *